US012612945B2

(12) United States Patent
Miyabe et al.

(10) Patent No.: US 12,612,945 B2
(45) Date of Patent: Apr. 28, 2026

(54) BEARING DEVICE AND ROTATING MACHINE

(71) Applicant: MITSUBISHI HEAVY INDUSTRIES, LTD., Tokyo (JP)

(72) Inventors: Tsuyoshi Miyabe, Tokyo (JP); Kenichi Murata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 96 days.

(21) Appl. No.: 18/700,938

(22) PCT Filed: Sep. 12, 2022

(86) PCT No.: PCT/JP2022/034051
§ 371 (c)(1),
(2) Date: Apr. 12, 2024

(87) PCT Pub. No.: WO2023/074155
PCT Pub. Date: May 4, 2023

(65) Prior Publication Data
US 2024/0410425 A1     Dec. 12, 2024

(30) Foreign Application Priority Data

Oct. 29, 2021     (JP) ................................. 2021-177357

(51) Int. Cl.
*F16C 35/02*          (2006.01)
*F16C 17/03*          (2006.01)
*F16C 23/04*          (2006.01)
(52) U.S. Cl.
CPC .............. *F16C 35/02* (2013.01); *F16C 17/03* (2013.01); *F16C 23/04* (2013.01)
(58) Field of Classification Search
CPC ........ F16C 17/03; F16C 17/035; F16C 23/04; F16C 35/02; F16C 35/10
See application file for complete search history.

(56) References Cited

U.S. PATENT DOCUMENTS 1,292,678 A * 1/1919 Barrett ................... F16C 35/02
                                                    384/255
3,851,935 A * 12/1974 Stahl .................... F01D 25/166
                                                    384/311
(Continued)

FOREIGN PATENT DOCUMENTS

DE      11 2013 006 848      12/2015
DE      11 2017 000 900      11/2018
(Continued)

OTHER PUBLICATIONS

International Search Report issued Nov. 15, 2022 in International Application No. PCT/JP2022/034051, with English Translation.
(Continued)

*Primary Examiner* — James Pilkington
(74) *Attorney, Agent, or Firm* — Wenderoth, Lind & Ponack, L.L.P.

(57)          ABSTRACT

A bearing device supports a rotary shaft that is rotatable about an axis extending in the horizontal direction, and includes: a bearing body which supports the rotary shaft; a support ring having a seating part including a support ring body that covers the bearing body from the outer circumferential side and a downwardly-oriented bottom surface that is provided integrally with the support ring body; and a bearing box which is provided separately from the support ring and which has a supporting surface abutting against the bottom surface. The bearing body has a ring part which covers the rotary shaft from the outer circumferential side; and a lower pad which is directly or indirectly supported by the inner circumferential surface of the ring part and which is slidably in contact with the outer circumferential surface of the rotary shaft.

6 Claims, 5 Drawing Sheets

(56)                     References Cited

U.S. PATENT DOCUMENTS

| | | | | | |
|---|---|---|---|---|---|
| 5,531,523 | A | * | 7/1996 | Subbiah .................. | F16C 17/03 |
| | | | | | 384/114 |
| 8,911,152 | B2 | * | 12/2014 | Waki ....................... | F16C 23/02 |
| | | | | | 384/129 |
| 2005/0275300 | A1 | | 12/2005 | El-Shafei | |
| 2008/0224556 | A1 | | 9/2008 | El-Shafei | |
| 2013/0272635 | A1 | | 10/2013 | Waki et al. | |
| 2015/0316104 | A1 | * | 11/2015 | Schulz .................. | F16C 35/047 |
| | | | | | 384/434 |
| 2016/0032963 | A1 | | 2/2016 | Tsutsumi et al. | |
| 2019/0048734 | A1 | | 2/2019 | Kuwamura et al. | |

FOREIGN PATENT DOCUMENTS

| | | |
|---|---|---|
| JP | 11-125246 | 5/1999 |
| JP | 2013-174278 | 9/2013 |
| JP | 2016-142312 | 8/2016 |
| JP | 2017-198087 | 11/2017 |
| JP | 2019-108966 | 7/2019 |
| KP | 10-2007-0039922 | 4/2007 |
| KP | 10-2014-0114872 | 9/2014 |

OTHER PUBLICATIONS

Written Opinion of the International Search Authority issued Nov. 15, 2022 in International Application No. PCT/JP2022/034051, with English Translation.

\* cited by examiner

BEARING DEVICE AND ROTATING MACHINE

TECHNICAL FIELD

The present disclosure relates to a bearing device and a rotating machine.

Priority is claimed on Japanese Patent Application No. 2021-177357, filed Oct. 29, 2021, the content of which is incorporated herein by reference.

BACKGROUND ART

For example, a rotating machine including a gas turbine or a steam turbine is provided with a bearing device by which a rotary shaft is rotatably supported. A journal bearing that supports a radial load of the rotary shaft and a thrust bearing that supports a load applied in a direction of an axis (central axis) of the rotary shaft are used as the bearing device.

Among these bearings, a journal bearing disclosed in PTL 1 described below is known as an example of the journal bearing. A device disclosed in PTL 1 to be described below includes a tubular support ring (support ring) that covers a bearing body from an outer peripheral side and a bearing box (bearing casing) that supports the support ring from below. The bearing box is in contact with a pair of flange portions, which protrudes from an outer peripheral surface of the support ring to both sides in a horizontal direction with respect to an axis, from below.

CITATION LIST

Patent Literature

[PTL 1] Japanese Unexamined Patent Application Publication No. H11-125246

SUMMARY OF INVENTION

Technical Problem

However, in the device disclosed in PTL 1, the flanges of the support ring are supported by the bearing box, but a load applied to the support ring from the rotary shaft acts strongly on an inner side of the flanges of the support ring as viewed from an axial center. For this reason, since the bearing box cannot firmly support the support ring, there is a concern that the support ring may be deformed. As a result, it may be difficult to stably support the rotary shaft.

The present disclosure has been made to solve the above-mentioned problem, and an object of the present disclosure is to provide a bearing device and a rotating machine that can more stably support the rotary shaft.

Solution to Problem

In order to solve the above-mentioned problem, there is provided a bearing device that supports a rotary shaft rotatable about an axis extending in a horizontal direction. The bearing device includes a bearing body that supports the rotary shaft; a support ring that includes a support ring body covering the bearing body from an outer peripheral side, and a pedestal portion provided integrally with the support ring body and including a bottom surface facing downward; and a bearing box that is provided separately from the support ring and that includes a support surface to be in contact with the bottom surface. The bearing body includes a ring part that covers the rotary shaft from the outer peripheral side, and a lower pad that is directly or indirectly supported by an inner peripheral surface of the ring part and that is in sliding contact with an outer peripheral surface of the rotary shaft. The support surface extends on at least an extension line of a straight line connecting the axis to a center of the lower pad in a circumferential direction as viewed in a direction of the axis.

Advantageous Effects of Invention

According to the present disclosure, it is possible to provide a bearing device and a rotating machine that can more stably support a rotary shaft.

DESCRIPTION OF EMBODIMENTS

A steam turbine 200 that is an example of a rotating machine according to an embodiment of the present disclosure and a bearing device 100 will be described below with reference to FIGS. 1 to 3.

(Configuration of Steam Turbine)

Figure 1:
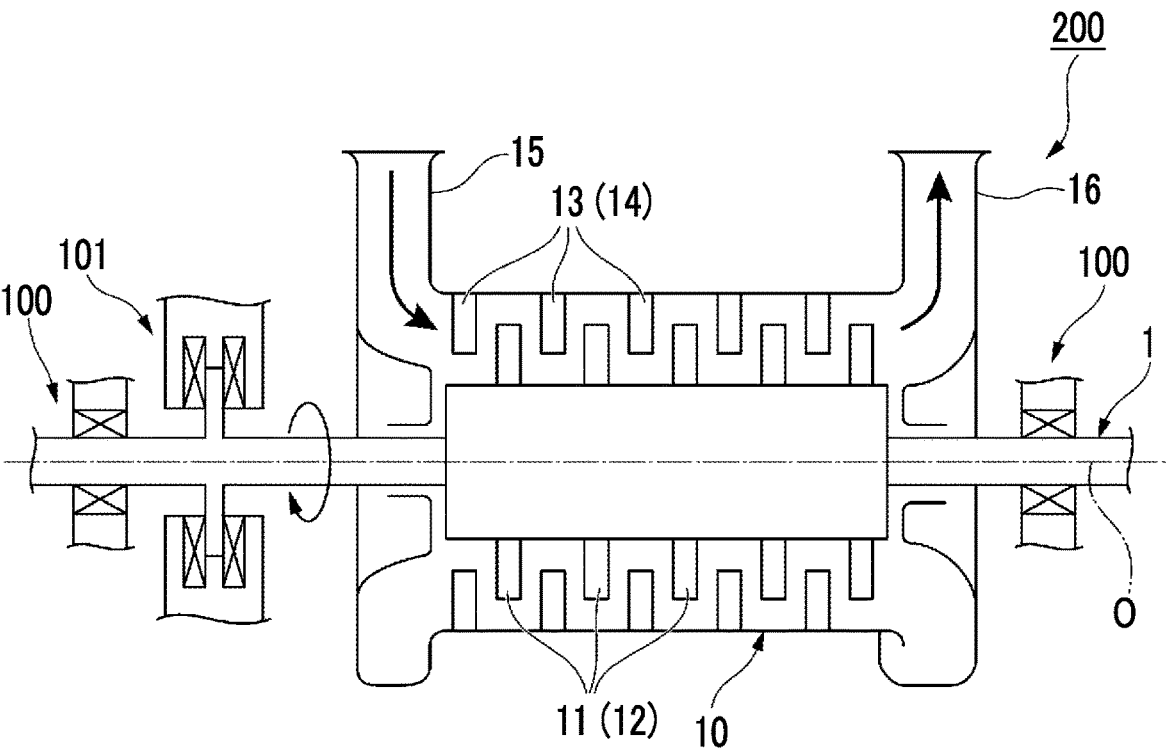
FIG. 1 is a schematic diagram showing a configuration of a rotating machine (steam turbine) according to an embodiment of the present disclosure.

As shown in FIG. 1, the steam turbine 200 includes a rotary shaft 1, a casing 10, bearing devices 100 (journal bearings), and a thrust bearing device 101. The rotary shaft 1 extends along an axis O. Shaft ends of the rotary shaft 1 are supported by a pair of bearing devices 100 and only one thrust bearing device 101 to be rotatable about the axis O. The bearing devices 100 support a load that is applied to the rotary shaft 1 in a radial direction. The thrust bearing device 101 supports a load that is applied in a direction of the axis O.

A plurality of rotor blade stages 11 that are arranged at intervals in the direction of the axis O are provided on an outer peripheral surface of the rotary shaft 1. Each of the rotor blade stages 11 includes a plurality of rotor blades 12 that extend outward from the outer peripheral surface of the rotary shaft 1 in the radial direction and that are arranged at intervals in a circumferential direction.

A portion of the rotary shaft 1 on which the rotor blade stages 11 are provided is covered with the casing 10 from an outer peripheral side. The casing 10 has a tubular shape centered on the axis O. A plurality of stator blade stages 13 that are arranged at intervals in the direction of the axis O are provided on an inner peripheral surface of the casing 10. Each of the stator blade stages 13 includes a plurality of stator blades 14 that extend inward from the inner peripheral surface of the casing 10 in the radial direction and that are arranged at intervals in the circumferential direction. The rotor blade stages 11 and the stator blade stages 13 described above are alternately arranged in the direction of the axis O. That is, one stator blade stage 13 is adjacent to one rotor blade stage 11 in the direction of the axis O.

A steam supply pipe 15 is provided on one side of the casing 10 in the direction of the axis O. A steam discharge pipe 16 is provided on the other side of the casing 10 in the direction of the axis O. Steam, which is supplied from the outside into the casing 10 through the steam supply pipe 15, alternately collides with the stator blade stages 13 and the rotor blade stages 11 to apply a rotational force to the rotary shaft 1. Accordingly, the rotary shaft 1 is rotated about the axis O.

The rotary shaft 1 has the shape of a column extending along the axis O extending in a horizontal direction. The "horizontal direction" mentioned here refers to a substantially horizontal direction, and slight manufacturing errors or design tolerances are allowed.

(Configuration of Bearing Device)

Figure 2:
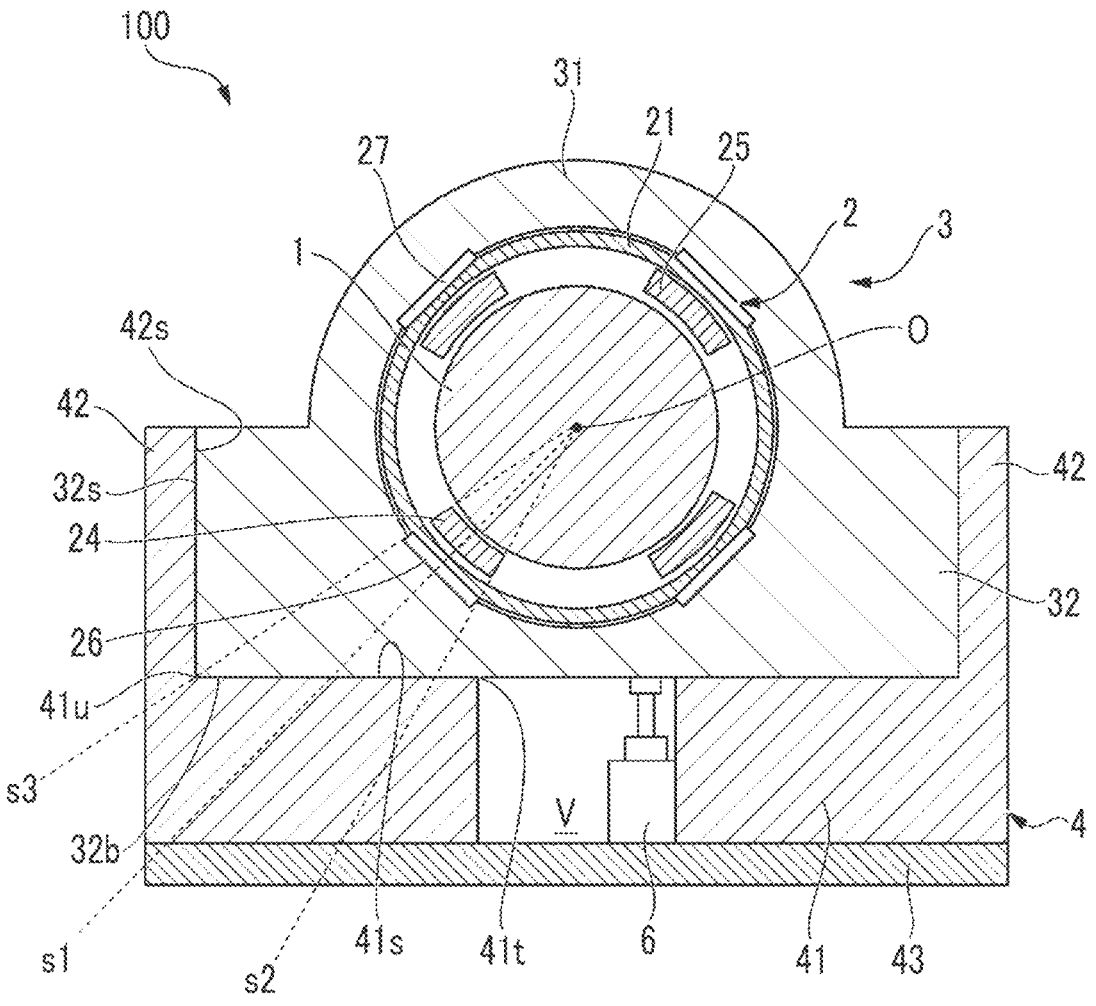
FIG. 2 is a cross-sectional view showing a configuration of a bearing device according to an embodiment of the present disclosure.

As shown in FIG. 2, the bearing device 100 includes a bearing body 2, a support ring 3, and a bearing box 4. The bearing body 2 includes a ring part 21, lower pads 24, upper pads 25, lower keys 26, and upper keys 27.

(Configuration of Bearing Body)

The ring part 21 covers the rotary shaft 1 from the outer peripheral side. The ring part 21 has a cylindrical shape centered on the axis O.

Each of the lower pads 24 and the upper pads 25 has an arcuate cross-sectional shape centered on the axis O, and extends in the circumferential direction. Inner peripheral surfaces of the lower pads 24 and the upper pads 25 are in sliding contact with the outer peripheral surface of the rotary shaft 1 via a lubricant. The bearing body 2 forms a pad bearing including four pads as described above.

(Configuration of Support Ring)

The support ring 3 includes a support ring body 31 and a pedestal portion 32. The support ring body 31 covers the bearing body 2 from the outer peripheral side. The support ring body 31 has a cylindrical shape centered on the axis O. The pair of lower keys 26 and the pair of upper keys 27 are provided on an inner peripheral surface of the support ring body 31. The lower keys 26 are disposed in a region below the axis O. The upper keys 27 are disposed in a region above the axis O. The lower keys 26 and the upper keys 27 are provided to determine the position of the bearing body 2 with respect to the support ring body 31 in the circumferential direction. The pair of lower keys 26 and the pair of upper keys are arranged at intervals of 90° in the circumferential direction by way of example.

The positions of the lower keys 26 in the circumferential direction correspond to the positions of the above-mentioned lower pads 24 in the circumferential direction. The positions of the upper keys 27 in the circumferential direction correspond to the positions of the above-mentioned upper pads 25 in the circumferential direction. Further, the dimensions of the lower key 26 and the upper key 27 in the circumferential direction are set to be equal to or slightly larger than the dimensions of the lower pad 24 and the upper pad 25 in the circumferential direction. Here, a radial load of the rotary shaft 1, which is borne by each lower pad 24, is supported by each lower key 26 via a lower pivot 22 and the ring part 21.

The pedestal portion 32 is formed integrally with a lower-half portion of the support ring body 31. The pedestal portion 32 has a substantially rectangular cross-sectional shape as viewed in the direction of the axis O. A lower surface of the pedestal portion 32 is a bottom surface 32*b*. The bottom surface 32*b* extends in a horizontal plane. Surfaces of the pedestal portion 32 facing the horizontal direction are side surfaces 32*s*. The bottom surface 32*b* and the side surface 32*s* are orthogonal to each other as viewed in the direction of the axis O.

(Configuration of Bearing Box)

The bearing box 4 is provided as a separate body to support the support ring 3 from below. The bearing box 4 includes a bearing box body 41, a pair of side wall portions 42, and a bottom portion 43. The bearing box body 41 has a rectangular cross-sectional shape as viewed in the direction of the axis O. An upper surface of the bearing box body 41 is a support surface 41*s*. The support surface 41*s* is in contact with the bottom surface 32*b* of the above-mentioned pedestal portion 32. Further, a recessed portion as an accommodation space V, which accommodates a device, such as a jack 6, is formed at a middle portion of the bearing box body 41 (that is, a region which is directly below the axis O and in which the support surface 41*s* does not extend). The jack 6 is used to adjust the position of the support ring 3 in a vertical direction. That is, the support surface 41*s* of the bearing box body 41 is divided into two in the horizontal direction by the accommodation space V.

Inner end edges 41*t* of the support surface 41*s* closer to the inside (the axis O) are provided at positions that satisfy the following conditions. Here, an extension line of a straight line connecting the axis O to a center of the lower pad 24 in the circumferential direction as viewed in the direction of the axis O will be denoted by s1. Further, an extension line of a straight line connecting the axis O to an inner end portion (a first end surface) of the lower pad 24 in the circumferential direction will be denoted by s2. Furthermore, an extension line of a straight line connecting the axis O to an outer end portion (a second end surface) of the lower pad 24 in the circumferential direction will be denoted by s3. Each of the inner end edges 41*t* of the support surface 41*s* is positioned more on an inner side (that is, a side closer to the axis O) than these extension lines s1 and s2. In other words, the support surface 41*s* extends at a portion where at least these extension lines s1 and s2 are positioned. Further, outer end edges 41*u* of the support surface 41*s* are positioned more on an outer side (that is, a side farther from the axis O) than these extension lines s1 and s3. In other words, the support surface 41*s* extends at a portion where at least these extension lines s1 and s3 are positioned.

Figure 3:
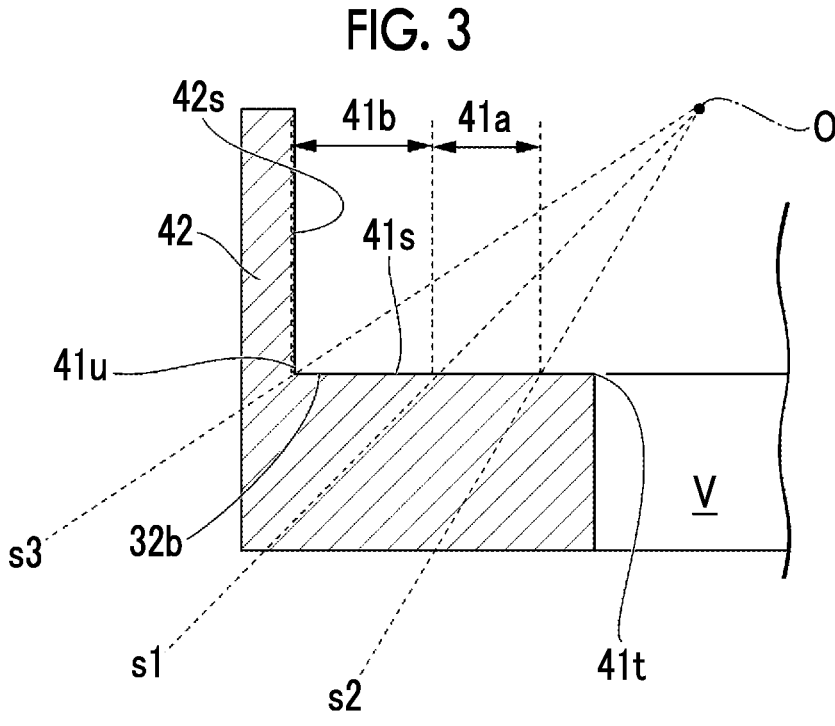
FIG. 3 is an enlarged cross-sectional view of main portions of the bearing device according to the embodiment of the present disclosure.

Specifically, as shown in FIG. 3, a portion, which is surrounded by the extension lines s1 and s2, of a virtual plane parallel to the support surface 41*s* is a load acting surface 41*a*. Further, a portion, which is surrounded by the extension lines s1 and s3, of the virtual plane parallel to the support surface 41*s* is a load acting surface 41*b*. In the present embodiment, each inner end edge 41*t* of the support surface 41*s* is positioned more on an inner side (a side closer to the axis O) than the load acting surface 41*a*. In other words, the entire load acting surface 41*a* is supported by the bearing box body 41. Furthermore, each outer end edge 41*u* of the support surface 41*s* is positioned more on an outer side (a side farther from the axis O) than the load acting surface 41*b*. In other words, the entire load acting surface 41*b* is supported by the bearing box body 41.

The side wall portions 42 extend upward from the outer end edges 41*u* of the support surface 41*s*. Inner surfaces 42*s*, which are surfaces of the side wall portions 42 facing inward, are in contact with the side surfaces 32*s* of the pedestal portion 32. The bottom portion 43 has the shape of a plate supporting the bearing box body 41 from below.

(Effects)

Conventionally, it has been common to individually design a bearing device 100 each time depending on a gas turbine or a steam turbine that is an object to which the bearing device is to be applied in the manufacture of the bearing device 100. For this reason, there has been a problem in that manufacturing costs and a manufacturing period for the bearing device 100 are increased.

Accordingly, in the bearing device 100 according to the present embodiment, the support ring 3 supporting the bearing body 2 and the bearing box 4 are formed of separate bodies. Therefore, it is possible to individually produce only the support ring 3 depending on the dimensions of the bearing body 2, and to standardize the bearing box 4. As a result, manufacturing costs and a manufacturing period can be reduced.

Here, the area of the above-mentioned support surface 41*s* is important to stably support the support ring 3 with the bearing box 4. In particular, a radial load applied by the rotary shaft 1 acts on the bearing box 4 in ranges that are surrounded by the extension lines s2 and s3 of the straight lines connecting the axis O to both end portions of the lower keys 26 in the circumferential direction. Therefore, if no members for supporting the load are provided in these areas, the bearing box 4 will not be able to rigidly support the support ring 3, and there is a risk that the support ring 3 will deform. As a result, it is difficult to stably support the rotary shaft 1.

Therefore, the above-mentioned configuration is employed in the present embodiment. According to the configuration, the support surface 41*s* of the bearing box 4 extends on the extension line s1 of the straight line that connects the axis O to the center of the lower pad 24 in the circumferential direction. In particular, the entire load acting surface 41*a* is supported by the bearing box body 41. A radial load applied by the rotary shaft 1 can be directly and stably supported by the support surface 41*s*. As a result, since deformation of the support ring 3 is suppressed, smooth rotation of the rotary shaft 1 can be maintained.

Further, a radial load applied by the rotary shaft 1 is transmitted to the bearing box 4 via the lower keys 26. Accordingly, it is necessary to support the radial load in ranges in which the lower keys 26 extend in the circumferential direction. According to the above-mentioned configuration, since the support surface 41*s* exists on the extension lines s2, s3 of the straight line connecting the axis O and each of the both ends of lower key 26 in the circumferential direction, the radial load can be more stably supported.

Furthermore, the radial load applied by the rotary shaft 1 includes a component facing the horizontal direction in addition to a vertically downward component. According to the above-mentioned configuration, the component facing the horizontal direction can be stably borne by the side wall portions 42 of the bearing box 4.

In addition, according to the above-mentioned configuration, the position of the support ring 3 in the vertical direction can be precisely adjusted by the jack 6 accommodated in the accommodation space V. In other words, according to the above-mentioned configuration, even in a case where the accommodation space V is unavoidably formed, the radial load applied by the rotary shaft 1 can be stably supported by the bearing box.

Moreover, according to the above-mentioned configuration, the center of the upper pad 25 in the circumferential direction is positioned on the extension line s1 of the straight line connecting the center of the lower pad 24 in the circumferential direction to the axis O. That is, the upper pad 25 is disposed to be point-symmetric to the lower pad 24 with respect to the axis O. Accordingly, a reaction force to a force applied to the lower pad 24 by the rotary shaft 1 can be stably supported by the upper pad 25.

Further, according to the above-mentioned configuration, the center of the upper key 27 is positioned on the extension line s1 of the straight line that connects the center of the lower key 26 to the axis O. That is, the upper key 27 is disposed to be point-symmetric to the lower key 26 with respect to the axis O. Accordingly, a reaction force to a force applied to the lower key 26 by the rotary shaft 1 can be stably supported by the upper key 27.

OTHER EMBODIMENTS

The embodiment of the present disclosure has been described in detail above with reference to the drawings. However, the specific configuration of the present disclosure is not limited to the embodiment, and the present disclosure includes design changes or the like without departing from the scope of the present disclosure.

Figure 4:
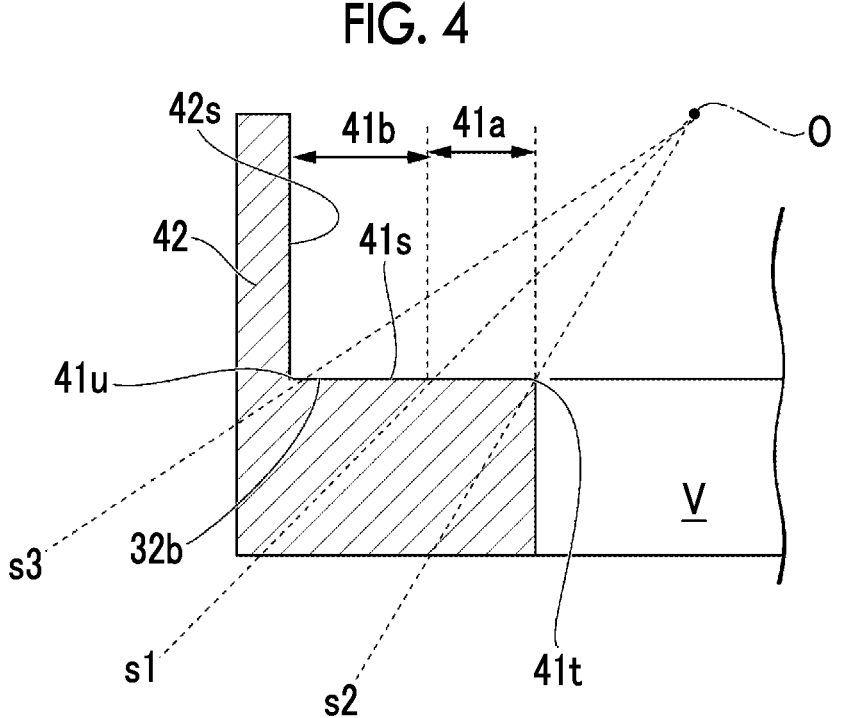
FIG. 4 is an enlarged cross-sectional view of main portions showing a first modification example of the bearing device according to the embodiment of the present disclosure.

An example in which the inner end edge 41*t* of the support surface 41*s* is positioned more on an inner side (a side closer to the axis O) than the load acting surface 41*a* has been described in the embodiment. However, a configuration shown in FIG. 4 can also be employed as a first modification example. In this example, the inner end edge 41*t* is provided at a position overlapping with the above-mentioned extension line s2. In this case, it is possible to increase the volume of the accommodation space V while supporting the entire load acting surface 41*a* with the bearing box body 41.

Figure 5:
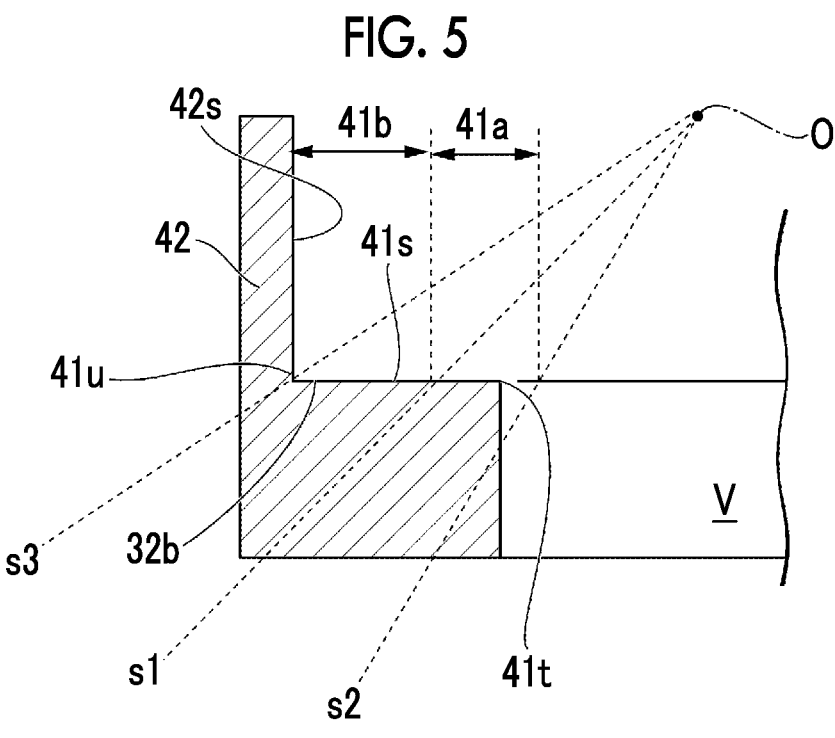
FIG. 5 is an enlarged cross-sectional view of main portions showing a second modification example of the bearing device according to the embodiment of the present disclosure.
Figure 6:
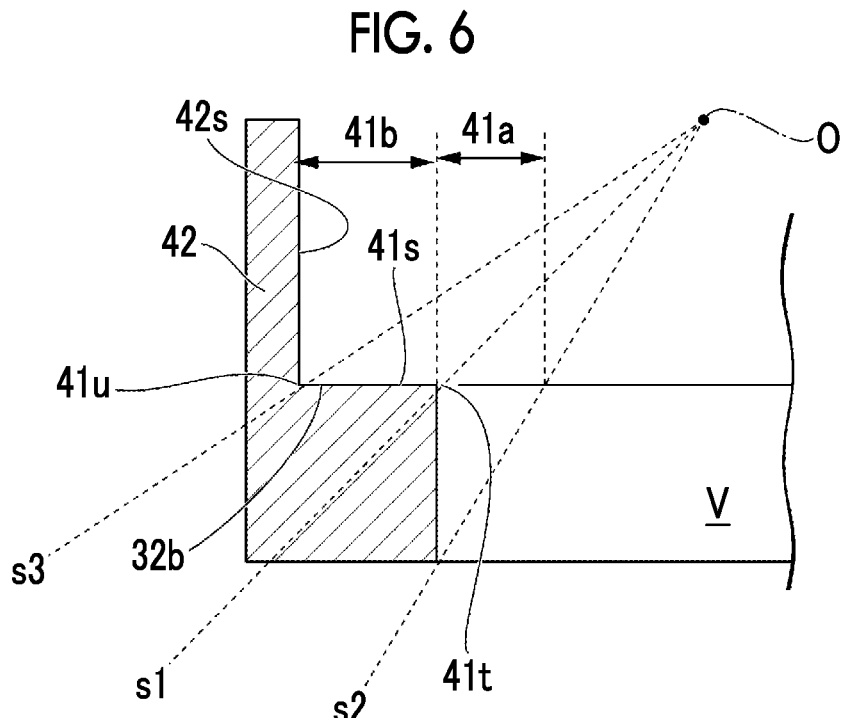
FIG. 6 is an enlarged cross-sectional view of main portions showing a third modification example of the bearing device according to the embodiment of the present disclosure.

In addition, a configuration shown in FIG. 5 can also be employed as a second modification example. In this example, the inner end edge 41*t* is provided between the extension lines s1 and s2 (that is, an intermediate position on the load acting surface 41*a*). In this case, it is possible to further increase the volume of the accommodation space V while receiving a minimum load acting on the extension lines s1 to s3. In order to maximize the volume of the accommodation space V while receiving a load, it is desirable to employ a configuration shown in FIG. 6 as a third modification example. In this example, the inner end edge 41*t* is positioned on the extension line s1.

Figure 7:
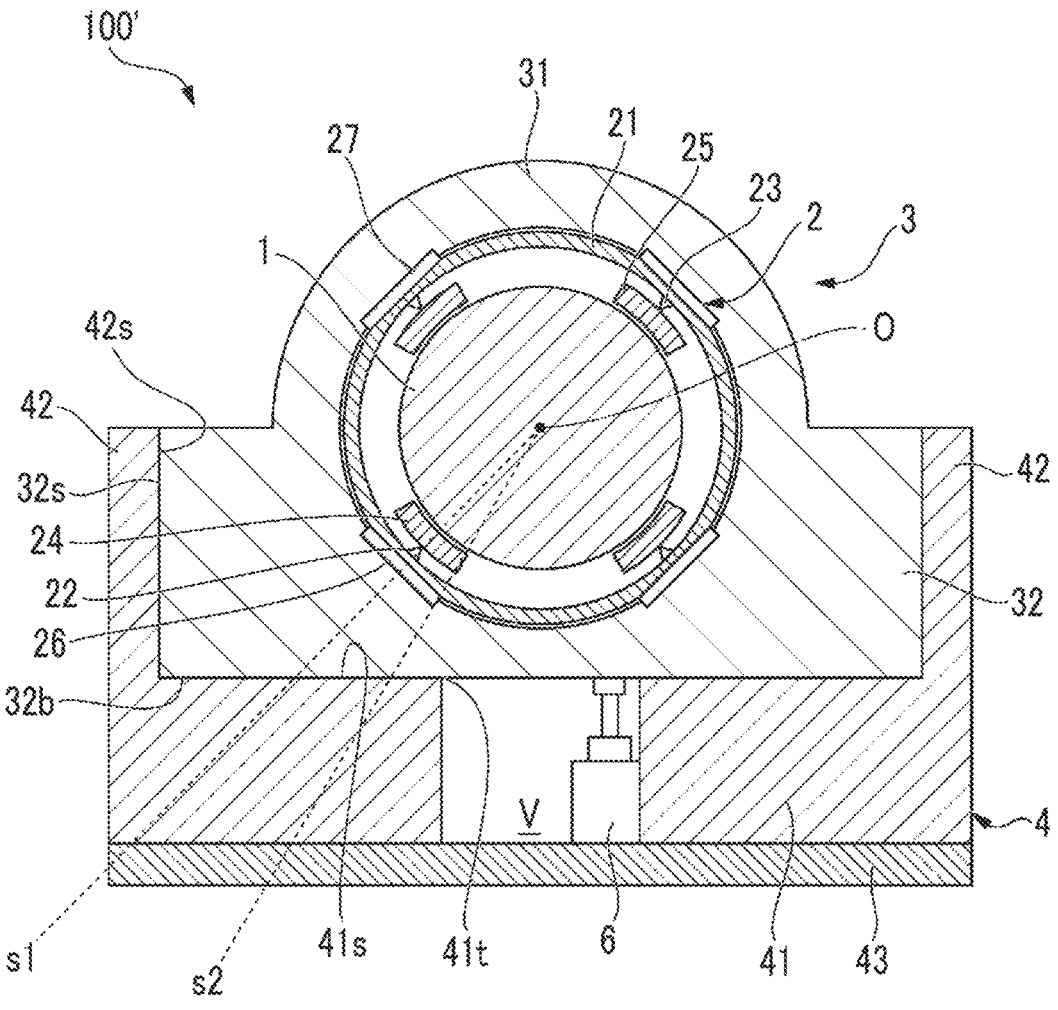
FIG. 7 is a cross-sectional view showing a fourth modification example of the bearing device according to the embodiment of the present disclosure.

Further, in the embodiment, the lower pads 24 and the upper pads 25 are provided in contact with the ring part 21 and are adapted to be directly supported by the ring part 21. However, a configuration in which a lower pivot 22 is provided between each lower pad 24 and the ring part 21 and an upper pivot 23 is provided between each upper pad 25 and the ring part 21 as in a bearing device 100' shown in FIG. 7 may be employed as a fourth modification example. The lower pivots 22 and the upper pivots 23 are disposed at central positions of the lower pads 24 and the upper pads 25 as viewed in the direction of the axis O, and support the lower pads 24 and the upper pads 25 such that the lower pads 24 and the upper pads 25 can oscillate. The lower pivots 22 and the upper pivots 23 are formed such that the dimensions of the lower pivots 22 and the upper pivots 23 in the circumferential direction are gradually reduced from the outside toward the inside in the radial direction as viewed in the direction of the axis O, and can support the lower pads 24 and the upper pads 25 at tip portions thereof such that the lower pads 24 and the upper pads 25 can oscillate. In this case, the lower pads 24 and the upper pads 25 are adapted to be indirectly supported by the ring part 21.

Further, a four-pad bearing provided with the upper pads 25 has been described in the embodiment by way of example. However, the upper pads 25 do not necessarily need to be provided, and the above-mentioned configuration can also be applied to a bearing including only the lower pads 24. Furthermore, an auxiliary device accommodated in the accommodation space V is not limited to the jack, and a device for treating a lubricant, or the like may be accommodated in the accommodation space V.

<Supplementary Notes>

The bearing device and the rotating machine according to the embodiments are understood, for example, as follows.

(1) A bearing device 100 according to a first aspect is a bearing device 100 that supports a rotary shaft 1 rotatable about an axis O extending in a horizontal direction. The bearing device 100 includes: a bearing body 2 that supports the rotary shaft 1; a support ring 3 that includes a support ring body 31 covering the bearing body 2 from an outer peripheral side, and a pedestal portion 32 provided integrally with the support ring body 31 and including a bottom surface 32b; and a bearing box 4 that is provided separately from the support ring 3 and that includes a support surface 41s to be in contact with the bottom surface 32b. The bearing body 2 includes a ring part 21 that covers the rotary shaft 1 from the outer peripheral side, and a lower pad 24 that is directly or indirectly supported by an inner peripheral surface of the ring part 21 and that is in sliding contact with an outer peripheral surface of the rotary shaft 1. The support surface 41s intersects with an extension line s1 of a straight line connecting the axis O to a center of the lower pad 24 as viewed in a direction of the axis O.

According to the above-mentioned configuration, since the support surface 41s intersects with the extension line s1 of the straight line connecting the axis O to the center of the lower pad 24, a radial load applied by the rotary shaft 1 can be directly and stably supported by the support surface 41s.

(2) According to a second aspect, the bearing device 100 of (1) may further include a lower key 26 that is provided between the support ring body 31 and the ring part 21, is disposed at a position corresponding to the lower pad 24 in the circumferential direction, and extends in the circumferential direction. The support surface 41s may intersect on extension lines s2, s3 of a straight line connecting the axis O and each of the both ends of the lower key 26 in the circumferential direction as viewed in the direction of the axis O.

Here, a radial load applied by the rotary shaft 1 is transmitted to the bearing box 4 via the lower key 26. Accordingly, it is necessary to support the radial load in a range in which the lower key 26 extends in the circumferential direction. According to the above-mentioned configuration, since the support surface 41s exists on the extension lines s2, s3 of the straight line connecting the axis O and each of the both ends of the lower key 26 in the circumferential direction, the radial load can be more stably supported.

(3) According to a third aspect, in the bearing device 100 of (1) or (2), the bearing box 4 may include a bearing box body 41 on which the support surface 41s is formed at an upper portion, and side wall portions 42 that are provided integrally with the bearing box body 41 and that sandwich the support ring 3 from both sides in the horizontal direction.

The radial load applied by the rotary shaft 1 includes a component facing the horizontal direction in addition to a vertically downward component. According to the above-mentioned configuration, the component facing the horizontal direction can be stably borne by the side wall portions 42.

(4) According to a fourth aspect, in the bearing device 100 of any one of (1) to (3), a recessed portion as an accommodation space V may be formed at a middle portion of the bearing box 4 where the support surface 41s does not extend.

According to the above-mentioned configuration, since the jack 6 or the like is disposed in, for example, the accommodation space V, the position of the support ring 3 in the vertical direction can be precisely adjusted. In other words, according to the above-mentioned configuration, even in a case where the accommodation space V is unavoidably formed, the radial load applied by the rotary shaft 1 can be stably supported by the bearing box 4.

(5) According to a fifth aspect, in the bearing device 100 of any one of (1) to (4), the bearing body 2 may further include an upper pad 25 that is directly or indirectly supported by the inner peripheral surface of the ring part 21 and that is in sliding contact with the outer peripheral surface of the rotary shaft 1, and the upper pad 25 may be positioned on the extension line s1 of the straight line connecting the lower pad 24 to the axis O as viewed in the direction of the axis O.

According to the above-mentioned configuration, the upper pad 25 is positioned on the extension line s1 of the straight line connecting the lower pad 24 to the axis O. That is, the upper pad 25 is disposed to be point-symmetric to the lower pad 24 with respect to the axis O. Accordingly, a reaction force to a force applied to the lower pad 24 by the rotary shaft 1 can be stably supported by the upper pad 25.

(6) A rotating machine (steam turbine 200) according to a sixth aspect includes the bearing device 100 of any one of (1) to (5), a rotary shaft 1 that is rotatably supported by the bearing device 100, and a casing 10 that covers the rotary shaft 1 from an outside.

According to the above-mentioned configuration, it is possible to provide the rotating machine (steam turbine 200) that can more stably operate.

INDUSTRIAL APPLICABILITY

According to the present disclosure, it is possible to provide a bearing device and a rotating machine that can more stably support a rotary shaft.

REFERENCE SIGNS LIST

100, 100': bearing device
200: steam turbine
1: rotary shaft
2: bearing body
3: support ring
4: bearing box
6: jack
10: casing
11: rotor blade stage
12: rotor blade
13: stator blade stage
14: stator blade
15: steam supply pipe
16: steam discharge pipe
21: ring part 22: lower pivot
23: upper pivot
24: lower pad
25: upper pad
26: lower key
27: upper key
31: support ring body
32: pedestal portion
32*b*: bottom surface
32*s*: side surface
41: bearing box body
41*a*: load acting surface
41*b*: load acting surface
41*s*: support surface
41*t*: inner end edge
41*u*: outer end edge
42: side wall portion
42*s*: inner surface
43: bottom portion
101: thrust bearing device
O: axis
V: accommodation space
s1: extension line
s2: extension line
s3: extension line

The invention claimed is:

1. A bearing device that supports a rotary shaft rotatable about an axis extending in a horizontal direction, the bearing device comprising:

a bearing body that supports the rotary shaft;

a support ring that includes a support ring body covering the bearing body from an outer peripheral side, and a pedestal portion provided integrally with the support ring body and including a bottom surface; and a bearing box that is provided separately from the support ring and that includes a support surface to be in contact with the bottom surface, wherein the bearing body includes a ring part that covers the rotary shaft from the outer peripheral side, and a lower pad that is directly or indirectly supported by an inner peripheral surface of the ring part and that is in sliding contact with an outer peripheral surface of the rotary shaft, and the support surface intersects with a first extension line of a straight line connecting the axis to a center of the lower pad as viewed in a direction of the axis.

2. The bearing device according to claim 1, further comprising:

a lower key that is provided between the support ring body and the ring part, is disposed at a position corresponding to the lower pad in the circumferential direction, and extends in a circumferential direction from a first end to a second end, wherein the support surface intersects second and third extension lines respectively connecting the axis to the first and second ends of the lower key as viewed in the direction of the axis.

3. The bearing device according to claim 1, wherein the bearing box includes a bearing box body on which the support surface is formed at an upper portion, and side wall portions that are provided integrally with the bearing box body and that sandwich the support ring from both sides in the horizontal direction.

4. The bearing device according to claim 1, wherein a recessed portion forming an accommodation space is formed at a middle portion of the bearing box where the support surface does not extend as viewed in the direction of the axis.

5. The bearing device according to claim 1, wherein the bearing body further includes an upper pad that is directly or indirectly supported by the inner peripheral surface of the ring part and that is in sliding contact with the outer peripheral surface of the rotary shaft, and the upper pad is positioned on the first extension line of the straight line connecting the lower pad to the axis as viewed in the direction of the axis.

6. A rotating machine comprising:

a bearing device according to claim 1;

a rotary shaft that is rotatably supported by the bearing device; and a casing that covers the rotary shaft from an outside.

* * * * *